UNITED STATES PATENT OFFICE.

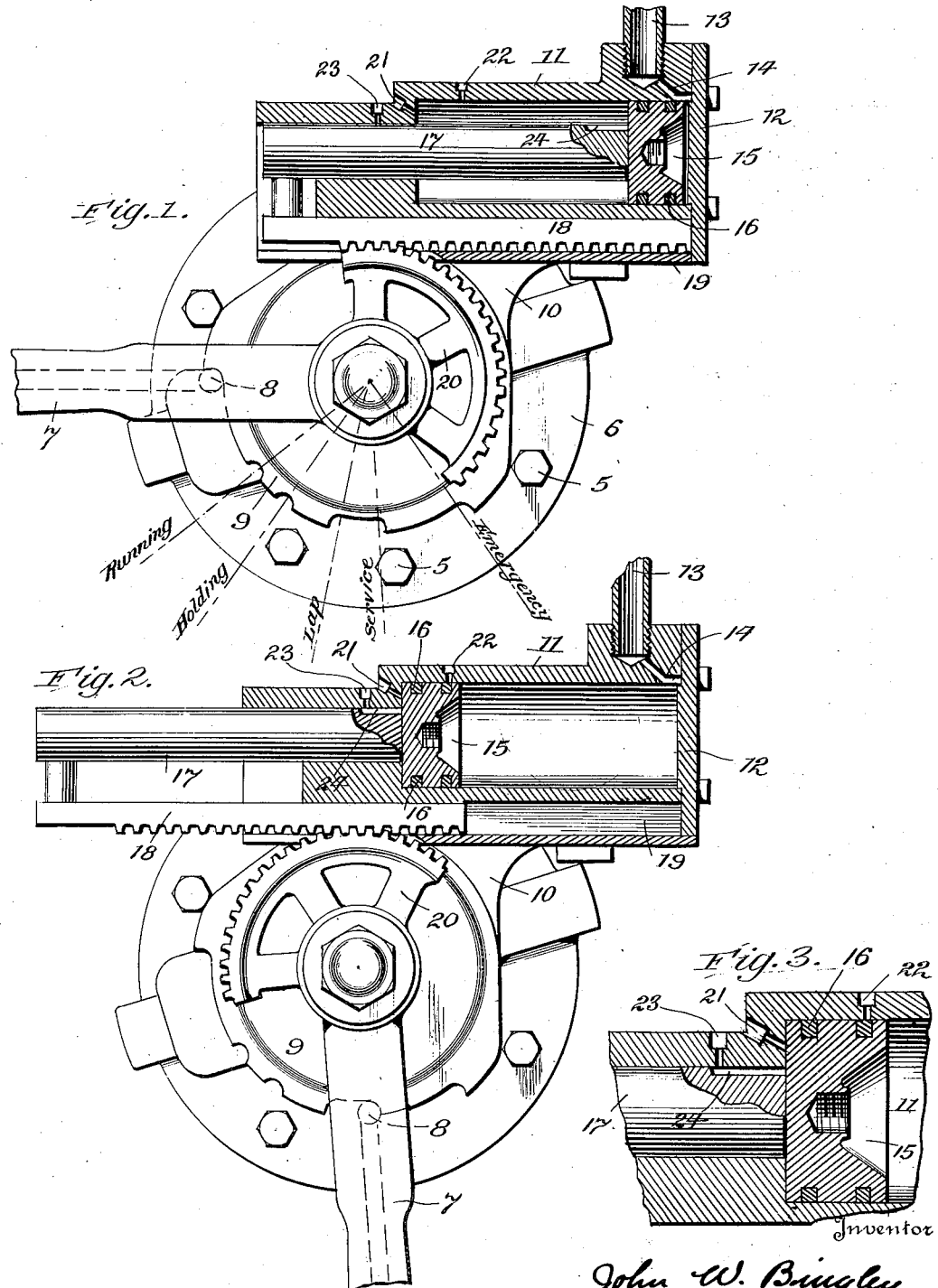

JOHN W. BINGLEY, OF WATERTOWN, NEW YORK, ASSIGNOR TO THE NEW YORK AIR BRAKE COMPANY, A CORPORATION OF NEW YORK.

ENGINEER'S BRAKE-VALVE.

1,370,183.   Specification of Letters Patent.   Patented Mar. 1, 1921.

Application filed August 4, 1920. Serial No. 401,241.

*To all whom it may concern:*

Be it known that I, JOHN W. BINGLEY, a citizen of the United States, residing at Watertown, in the county of Jefferson, and State of New York, have invented certain new and useful Improvements in Engineers' Brake-Valves, of which the following is a specification.

This invention relates to air brakes and particularly to an engineer's brake valve intended primarily for use with automatic train stop systems.

The object of the invention is to provide an improved pressure motor so related to the rotary valve, forming a part of the usual engineer's brake valve, as to move said rotary valve to service application position and bring it to rest, so that it may be moved thereafter to emergency position by hand.

A valve motor of this general type is described and claimed in my prior application Serial No. 132,873, filed November 22, 1916, and consequently certain features of the motor and valve claimed in the prior application are described in the present application but are not claimed herein.

The present invention adds to the prior device a novel form of pneumatic check, designed to insure that the motor will be brought gently to rest when the valve reaches service application position. While the valve of my prior application operates satisfactorily, it is found that when the motor and valve have been used for a considerable period, and hence operate quite freely, there is a tendency for the mechanism to over-travel, the rotary valve frequently moving by its acquired momentum past service position to emergency position. While this action can be prevented by proper adjustments of the valve, the present invention obviates the necessity of any attention or adjustment.

I illustrate a satisfactory embodiment of the invention in the accompanying drawing, in which:—

Figure 1 is a plan view of an engineer's valve with the valve actuating motor shown in longitudinal axial section. In this view the valve is in release position.

Fig. 2 is a similar view showing the valve moved to service application position by the motor, and Fig. 3 is an enlarged fragmentary view similar to Fig. 2, and showing the relation of the piston and piston rod to the piston checking ports.

The valve is intended chiefly for use with engineers' brake valves of the equalizing discharge type. These commonly have six positions known as "release," "running," "holding," "lap," "service," and "emergency" positions. The successive positions of the valve handle are indicated by legends on Fig. 1. The removable cap forming part of the casing of an ordinary engineer's brake valve is indicated at 6. It is held to the body of the valve casing by bolts 5. The handle of the brake valve is shown at 7, the handle detent at 8, and the detent sector at 9. All of the above mentioned parts will be recognized as of ordinary construction with the exception of minor additions to the cap and the handle, which will be described later.

Formed on the cap 6 is a boss 10 to which is bolted a horizontal cylinder 11. This cylinder is closed at one end by a removable head 12, and is formed at the opposite end with a closely fitting guideway for the piston rod. The cylinder 11 has near its head end a tapped opening to receive the pressure fluid pipe 13 which communicates with the head-end pressure port 14. The pipe 13 is connected with a source of pressure fluid, and the flow of pressure fluid is controlled by any suitable means, for example, by a valve forming part of any automatic train stop mechanism. A piston 15 provided with piston rings 16 is slidably mounted in the cylinder 11. Usually the rings 16 do not fit so tight as to preclude slight leakage of pressure past the piston, and this leakage is availed of to relieve the cylinder of pressure when the pressure supply is cut off. Such leakage is far less than the capacity of port 14, and hence is insufficient to interfere with the action of the motor when pressure fluid is admitted thereto. Any equivalent means for venting pressure from the motor, such for example as a small leak port (not shown) leading from port 14 to the atmosphere might be adopted. The piston 15 abuts against a piston rod 17, but is not connected thereto. The rod 17 is guided in the end of the cylinder 11 and is connected to a laterally offset rack 18, which is guided in a guideway 19 formed in the side of the cylinder 11. The rack 18 meshes with a sector gear 20 formed on the handle 7, The parts so far described do not differ in any essential particular from the structure of my prior application. In my former construction I made use of a port similar to port 21 of the present device to relieve the pressure behind piston 15, when the piston moves outward under pressure entering through port 14. The port 21 of the present application is, however, preferably made smaller than the corresponding port of my prior construction, and in addition to the port 21 I provide a supplementary port 22 of equal, or preferably greater, capacity. The port 22 is formed through the side of the cylinder 1 and so positioned as to be operative throughout the initial movement of the piston 15 from its inert position. The port 22 is, however, blanked by the piston 15 when this approaches the end of its travel and remains blanked by the piston 15 thereafter.

The effect of this construction is to allow the piston to move very rapidly at first and then to check the piston by checking the bleeding of pressure fluid from the space behind the piston. By making the port 21 small this checking action can be made quite severe. As the piston 15 closely approaches its final limit of travel and after its motion has been sharply checked, it is desirable to release the air trapped behind it more rapidly than by flow through the port 21. Accordingly I form in the piston rod 17 a grooved port 24 which opens communication with a relatively large feed port 23 just before the piston 15 reaches its limit of travel. This insures complete travel.

The operation of the device is as follows:
Assume that the train is in motion and that the valve handle is in release position as shown in Fig. 1, or in running position. If the engineer passes a signal and the safety stop mechanism operates to admit pressure fluid to pipe 13, the pressure fluid entering through port 14 will move piston 15 rapidly to the left (with reference to Fig. 1) and the air displaced by the piston will be freely vented through ports 21 and 22. The piston will engage and force outward the piston rod 17 and through the rack and gear, will swing the valve handle rapidly past running and holding position. At or about the time it reaches lap position, the piston 15 will blank port 22. The air behind piston 15 can now escape only through the restricted port 21. This causes a marked retardation of the piston 15, which thereafter completes its travel slowly, moving the valve through lap to service position. Just as the valve reaches service position the port 24 becomes effective to bleed any remaining back pressure through port 23, and thus insures full travel of the piston 15.

It is thus possible to move the handle 7 to service application position with the utmost rapidity and without danger that it will over-travel by momentum to emergency position. Since the piston rod 17 is not connected to the piston 15, the handle 17 may be moved manually to emergency position should the engineer desire to make an emergency application. After the safety stop has been completed and the automatic stop mechanism reset pressure in the cylinder will leak away and the valve handle may be moved back to release position, thus restoring the piston 15 to its normal position at the head end of the cylinder.

The main advantage of the construction described is, the possibility of much more rapid action in moving the brake handle to service position, without danger of overthrowing the handle because the motor piston is checked in time to permit the handle detent to function with certainty. The device also has the advantage, characteristic of my prior construction, that the frictional load of the piston is not imposed on the valve handle in ordinary manual operation, while all other moving parts of the mechanism are constantly actuated during the manual operation of the valve, thus insuring that they will never be stuck or inoperative when needed.

What is claimed is:

1. The combination of an engineer's brake valve; a pressure-motor operatively related to said valve, and including a cylinder and a piston working therein; and a pneumatic check serving to retard said piston near the end of its operative stroke.

2. The combination of an engineer's brake valve; a pressure-motor operatively related to said valve, and including a cylinder and a piston working therein; and a pneumatic check serving to retard said piston and including ports whose effective area is diminished by the approach of the piston to the end of its operative stroke.

3. The combination of an engineer's brake valve; a pressure-motor operatively related to said valve, and including a cylinder and a piston working therein; and a back-pressure device for checking said piston, and including bleed ports controlled by the piston near the end of the operative stroke of the latter.

4. The combination of an engineer's brake valve; a pressure motor including a cylinder and a piston working therein; a piston-rod serving as an operative connection between said motor and valve; and a back-pressure device for checking said piston and including bleed-ports, one of which is blanked by the piston in the latter part of the operative stroke thereof and another of which is closed by said piston-rod throughout substantially the entire operative stroke of said piston, and is opened by said rod in the limiting position of said piston.

5. The combination of an engineer's brake valve; a pressure-motor including a cylinder and a piston working therein; a piston rod operatively connected with said valve, and adapted to be engaged and moved by said piston when the piston is forced from its normal retracted position; and a back-pressure device for checking said piston and including bleed-ports, one of which is blanked by said piston in the latter part of the operative stroke thereof, and another of which is closed by said piston-rod throughout substantially the entire operative stroke of said piston, and is opened by said rod in the limiting position of said piston.

In testimony whereof I have signed my name to this specification.

JOHN W. BINGLEY.